Aug. 8, 1961  N. A. KIMMEL  2,995,011
SOLID PROPELLANT ROCKET MOTOR
Filed Sept. 17, 1959  2 Sheets-Sheet 1
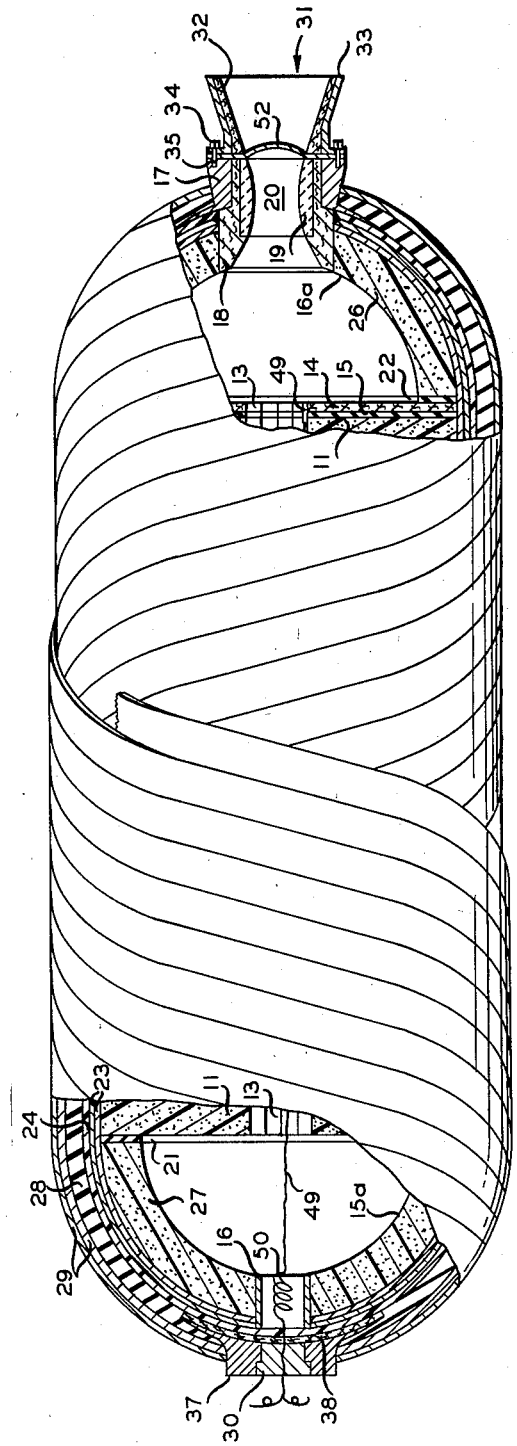
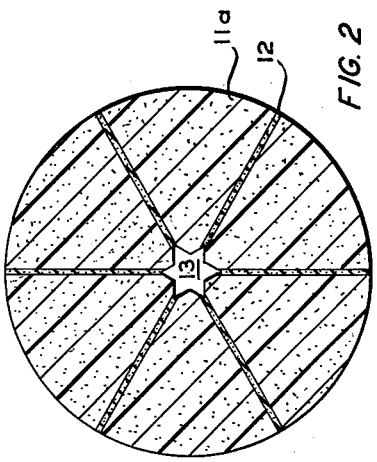
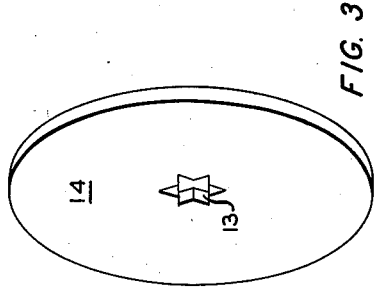
INVENTOR.
N. A. KIMMEL
BY
ATTORNEYS Aug. 8, 1961  N. A. KIMMEL  2,995,011
SOLID PROPELLANT ROCKET MOTOR
Filed Sept. 17, 1959  2 Sheets-Sheet 2

INVENTOR.
N. A. KIMMEL
BY *Hudson & Young*
ATTORNEYS

United States Patent Office 2,995,011
Patented Aug. 8, 1961

2,995,011
SOLID PROPELLANT ROCKET MOTOR
Norman A. Kimmel, Brigham City, Utah, assignor to Phillips Petroleum Company, a corporation of Delaware
Filed Sept. 17, 1959, Ser. No. 840,780
4 Claims. (Cl. 60—35.6)

This invention relates to solid propellant rockets embodying a solid rocket grain of the restricted burning type for use in large rocket motors. In one aspect it relates to the form and construction of a complete solid propellant missile in which pressure outside of the solid propellant balances the pressure within the propellant grain thus preventing grain breakup with consequent failure of the motor.

In prior art rocket motors employing solid propellant composition grains, the use of steel cases has been common. Particularly in large missiles, for example, those of about 24 inches and larger in diameter, propellant grains tend to break or crack under the influence of pressure after ignition. Cracking or breaking of the grain may, in some cases, be caused merely by the weight of the grain but, in general, most cracking of the grain is caused by the rapidly increasing pressure within the grain during combustion which causes expansion of the steel case.

According to the present invention, I provide for equalization of pressure on the inside and outside of the propellant grain so that there is no pressure differential across the grain.

An object of this invention is to provide a rocket motor employing a solid propellant grain which will not break or develop cracks because of internal pressure of gases after ignition. Another object of this invention is to provide such a type of solid propellant missile adapted for use with large diameter missiles. Still other objects and advantages of this invention will be realized upon reading the following description which, taken with the attached drawing, forms a part of this specification.

In the drawing,

FIGURE 1 is a longitudinal view, partly in section, of one embodiment of my invention.

FIGURE 2 is a cross sectional view of a propellant grain of this invention.

FIGURE 3 is a perspective view of a portion of the apparatus of FIGURE 1.

Figure 4:
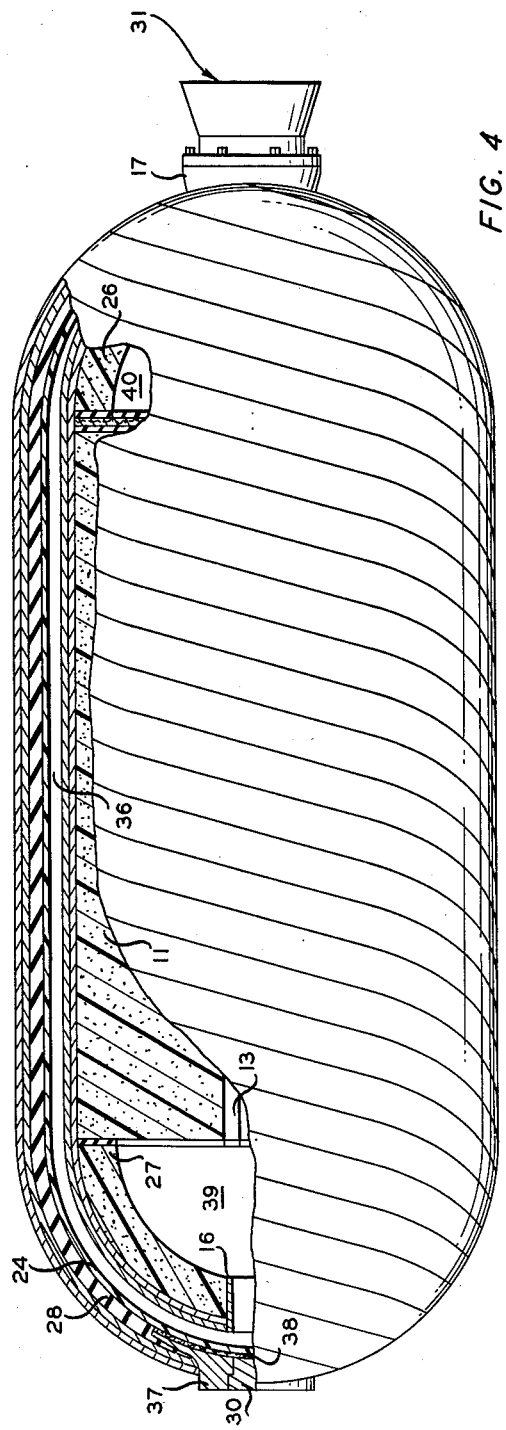
FIGURE 4 is a longitudinal view, partly in section, of the apparatus of FIGURE 1 with the outer casing being in an expanded condition.

Referring to the drawing, and specifically to FIGURE 1, the main body of solid propellant grain 11 is an elongated form of generally cylindrical shape. This propellant is preferably made up of a number of segments of grain 11a, as illustrated in FIGURE 2. These segments of grain are prepared by extrusion, each segment of grain having the general form as illustrated in FIGURE 2. As illustrated in this figure, the compete cylindrical form of propellant is composed of six of these individual segments 11a. Other numbers of grains, as 4, 5 or 7 or more or less can be used as well as six. The several segments of grain 11a are separated by sheets of dense sponge rubber 12. This assembly of grain segments and sponge rubber sheets is placed upon a plate of, for example, a phenol-formaldehyde resin containing asbestos. This plate is provided with a star-shaped opening 13, as illustrated in FIGURE 3. Upon extruding the grain segments 11a in the form illustrated in FIGURE 2 and assembling them with the sponge rubber separators, an opening in the center is formed having the same configuration as the opening in the plate of FIGURE 3. The sponge rubber separators serve as expansion joints. The segment grains are cemented to one side of a plate 14 with a cement such as an epoxy or other suitable cement, identified by reference numeral 15, in FIGURE 1. A suitable epoxy resin for this and other cementing operations as disclosed herein has an epoxide equivalent weight of about 140–525. A diluent, such as benzene, methylene chloride or carbon tetrachloride, is used to thin the epoxy compond and facilitate application by brushing and by spraying. Various curing agents such as diethylaminopropylamine, diethylenetriamine, and dicyandiamide are used to promote cure of the epoxy compounds. Still other epoxy-containing compounds which are employed as adhesives include liquid polymers of 1,3-butadiene which are epoxized, for example, by treatment with peroxide. The polymers obtained by copolymerization of 1,3-butadiene with monomers such as styrene are epoxidized to give products used in the production of adhesive and cement as used in the structures of this invention.

After the segments of propellant and rubber separators are mounted on plate 14, a mandrel, conforming to the shape of openings 13, is inserted through opening 13 in the assembly of segment grains and the opening in plate 14, and a pressure fixture, such as a steel tube containing a rubber expansion bladder or tube, is placed around this assembly of grain segments and air pressure is applied, along with proper temperature, as necessary to cure the binder of the propellant segments and to bond the extruded sections of propellant to the rubber expansion separators. Such a pressure fixture comprises a rubber tube disposed within a steel tube with the ends of the rubber tube attached gastight to the corresponding ends of the steel tube. The steel tube is provided with a side connection for applying vacuum or pressure as desired. Such a pressure fixture is fully described in a copending application by Barnet R. Adelman, Serial No. 528,156, filed August 15, 1955. After this bonding operation is completed air pressure is released and the pressure fixture and mandrel are removed.

In some cases the extruded propellant segments do not need to be cemented to the sponge rubber separators because with the separators being held tightly against the propellant segments, as disclosed herein, upon curing of the extruded grain segments the rubber separators are firmly attached to the cured segments.

A hemispherical forward end section 15a is molded from a molding type solid propellant. In molding this section 15a, an asbestos-containing phenolformaldehyde resin tube 16 is positioned as illustrated in FIGURE 1. This end section 15a is cemented with epoxy resin at 21 to the end of the body of propellant 11.

An aft end section 16a of propellant is molded from a solid propellant similar to that mentioned relative to end section 15a.

The aft end section 16a is cemented to the other side of plate 14a at 22 by an epoxy cement.

A long mandrel is inserted through opening 20 in the aft end section 16a and through the star-shaped openings 13 in plate 14 and in the propellant 11. This mandrel is extended on through tube 16 in the forward end section 15a. This propellant assembly is mounted on this mandrel in a lathe or filament-winding machine in such a manner that the assembly of propellant grain members can be rotated. After mounting in the lathe, the propellant is rotated and all the surface sections are smoothed preparatory for subsequent treatment. A Fiberglas roving 23, which is impregnated with an epoxy resin, is wound in a reverse spiral pattern over the smoothed propellant charge assembly to afford strength over its entire surface and to serve as a combustion or burning restricting material. This protective coating of resin-impregnated Fiberglas is cured by use of a bank of infrared or strip heaters, preferably operated by remote control for safety. After the cured Fiberglas resin coating has been cooled, its surface is smoothed and a polyethylene plastic film or bag 24 is placed around the entire surface of the assembly. Two openings are provided in this polyethylene cover through which the mandrel which supports this propellant assembly extends. The edge of this polyethylene cover 24 is cemented to the Fiberglas resin coating 23 with an epoxy resin at 25 to provide a gastight seal. The opening in the polyethylene cover or envelope 24 at the forward end of the assembly is not cemented to any apparatus part at this time.

An asbestos-containing phenol-formaldehyde resin insulator 18 is cemented into a metallic nozzle boss 17 to form an assembly as illustrated in FIGURE 1. This metallic nozzle boss is preferably made of aluminum.

The aluminum nozzle boss, with inserted insulator, is slipped over the end of the mandrel and these elements are cemented with an epoxy resin into opening 20, as illustrated in FIGURE 1.

An asbestos-containing phenol-formaldehyde resin curved plate insulator 38 is cemented with an epoxy resin to the concave surface of a metal head 37. The plate insulator 38 has an opening in its center corresponding to the opening in metal head 37. This assembly of metal head 37 and plate insulator 38 is slipped over the end of the mandrel at the forward end of the missile and the plate insulator is cemented with an epoxy resin to the polyethylene plastic envelope so as to form a gastight seal. After this seal has properly hardened, a coating 28 of GRS rubber, of a desired thickness, is placed over the polyethylene cover and over adjacent surfaces of the metal head 37 and nozzle boss 17 so as to seal completely the metal head and the nozzle boss to the rubber coating. This layer of rubber can, if desired, be built up by spraying a solution of the rubber onto the surface of the polyethylene while simultaneously curing the rubber with heat lamps. A second layer 29 of Fiberglas roving impregnated with an epoxy resin is wound around this entire assembly in a reverse helical pattern in such a manner as to impart proper strength to the assembly. This epoxy resin is cured by a bank of infrared or strip heater lamps with remote temperature control for safety reasons. Upon completion of the setting and hardening of the epoxy resin, the assembly is cooled and removed from the winding mandrel. The forward head plug 30 is cemented into the metal head 37 with epoxy resin.

Upon insertion and proper sealing of the head plug 30, the entire assembly is fully gastight with the exception of the opening 20 through the nozzle end. The assembly is tested for proper construction by admitting air under pressure through the nozzle opening 20. Air under pressure admitted into this assembly passes through tube 16 and tends to expand the polyethylene bag and its rubber and Fiberglas coverings. This expansion forms an annulus between the polyethylene bag and the inner Fiberglas roving 23. In this manner pressures on opposite sides of the propellant grain are equalized. Thus, the entire body of propellant, with its outer surface restricted against burning, is actually a floating body within the outer shell or case of the missile. With this pressure equalization, the tendency for the propellant grain to crack or break under stress of pressure is markedly reduced. The same pressure equalization occurs during firing of the missile because the pressure of the gas formed during burning of the propellant is transmitted through tube 16 into the annular space between the restricting layer of Fiberglas roving 23 and the polyethylene bag 24.

After pressure testing of this assembly, a metallo-ceramic nozzle insert 19 is cemented into place, as illustrated in FIGURE 1, with an epoxy resin.

A cast propellant suitable for use in the aft and forward ends of the rocket herein described, and an extruded propellant suitable for use in the central body portion, intermediate the end portions, are described in Propellant Systems, by F. A. Warren, 1958, Reinhold Publishing Corporation, New York, N.Y. Also described in this publication, and suitable for use in the rocket disclosed herein, are solid propellants embodying such oxidizers as potassium perchlorate, ammonium perchlorate, ammonium nitrate with asphalt phenolic resin, polystyrene, synthetic rubbers, urea-aldehyde, and vinyl polymers. These latter materials serve as fuel for the oxidizers as well as binders. Additives such as oxidants, antioxidants, accelerators, catalysts, extenders, reinforcing agents and fillers for use with solid propellants are also described.

A nozzle for this missile can be prepared by employing a double cone mandrel designed to fabricate two nozzles simultaneously. Such a mandrel has the appearance of two cones joined at their apexes. This cone mandrel is mounted in a lathe or other winding machine so that the mandrel can be rotated as desired. After applying a coating of a suitable mold release, such as Dri-Film, a silicone resin manufactured by General Electric Company, the D.C. Mold Release Emulsion No. 35, manufactured by Dow Corning Corporation, or a halogen-containing polymer such as polytetrafluoroethylene, one or more layers of an asbestos tape impregnated with a phenolic-formaldehyde resin is wound on the surface of the mandrel to such a thickness as desired. Upon this layer 32 pressure is applied by winding a film of Fiberglas and this double layered assembly is cured in an autoclave. This Fiberglas winding is sufficiently porous and will allow gases to escape during curing of the resin. After proper curing of the resin, the Fiberglas is machined off and then a Fiberglas roving 33 impregnated with an epoxy resin is film wound over the phenol-formaldehyde as a liner. At the juncture of the two cones of the mandrel the Fiberglas roving, impregnated with epoxy resin, is built up to such a thickness as is suitable for forming a flange, as hereinafter disclosed. Upon setting of this epoxy resin the two nozzle sections are separated by cutting through the center of the built-up flange portion, thus making two nozzles each containing a flange. Bolt holes are drilled through the flange of each nozzle and into the aluminum nozzle boss 17. Upon threading of the holes in the nozzle boss 17, the nozzle is attached to the nozzle boss by bolts 34. The flange of the nozzle assembly 31 is identified in FIGURE 1 by reference numeral 35, the Fiberglas roving on the outer surface by reference numeral 33 and the phenolic resin-containing asbestos inner portion by reference numeral 32.

In FIGURE 4 is illustrated space 36 between the restricting layer of Fiberglas and epoxy resin covering the outer surface of the solid propellant grain and the inner surface of the polyethylene cover 24 which provides for pressure equalization on all sides of the solid propellant. Thus pressure exerted in space 40, opening 13, space 39, space inside tube 16 and space 36 is intended to be the same.

Figure 5:
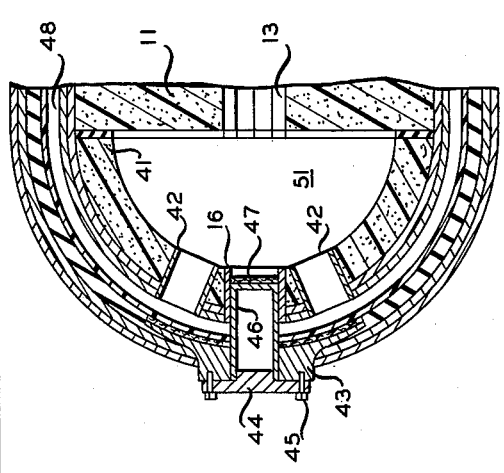
FIGURE 5 is a longitudinal view, in section, of an alternate embodiment of this invention.

In FIGURE 5 is illustrated an alternate embodiment of the forward end of the missile of this invention. This embodiment involves use of a slide member 46 attached rigidly to a metal head 43, as illustrated. To this metal slide 46 is cemented, as by an epoxy resin, an asbestos-containing phenol-formaldehyde insulator 47, as shown. A metal plug 44 is attached to the metal head 43 by bolts 45. One or more openings 42 are provided for communication of pressure between space 51 to space 48. This mode of construction tends to provide additional support for the forward end of propellant 41 with respect to the leading end of the entire assembly and yet provides for movement of the leading end of the outer cover with respect to the hemispherical propellant 41.

An igniter 49 is illustrated in FIGURE 1 as extending through head plug 30 and throughout the entire length of the star-shaped opening 13 in the main body of propellant. This igniter is coiled within tube 16 in such a manner that as the metal head 37 moves to the left upon increase of pressure within the missile, the igniter element 49 will not be removed from its proper position within the star-shaped opening 13. The expansible coil in the tube 19 is identified by reference numeral 50.

It is believed that the compositions of phenol-formaldehyde resins are well known by those skilled in the art and further description thereof need not be made herein.

Upon mounting nozzle assembly 31 onto the nozzle boss 17, a rubber burst diaphragm or starter disc 52 is inserted therebetween since, as is well known by those skilled in the art, solid propellants are most successfully ignited under pressure. The thickness of this burst diaphragm is dependent upon the pressure required for successful ignition of the propellant.

While certain embodiments of the invention have been described for illustrative purposes, the invention obviously is not limited thereto.

I claim:

1. A solid propellant rocket comprising, in combination, a body of solid propellant having an axial first opening throughout its length, an expansible, fluid-tight bag surrounding said propellant, one end of said rocket being provided with an exhaust nozzle, said nozzle being in communication with said opening for passage of exhaust gases therefrom, an enclosing member surrounding said bag, a second opening in said bag and a third opening in said enclosing member, the peripheries of these latter openings surrounding said exhaust nozzle and being sealed gas-tight thereto, the inner surface of said bag at the end of said first opening opposite said nozzle being uncovered in such a manner that upon ignition of said propellant pressure of combustion gases distends said bag and forms a space between said bag and said propellant thereby permitting equalization of combustion gas pressure on the inside and outside of said propellant, and means extending from the exterior of said rocket into said first opening for igniting said propellant.

2. A solid propellant rocket comprising, in combination, a body of solid propellant, a first opening throughout the length of said body, the outer surface of said body of solid propellant being restricted, a flexible, fluid-tight bag surrounding said propellant, said rocket having a forward end, and an aft end provided with an exhaust nozzle assembly, a flexible enclosing member surrounding the flexible bag, a second opening in said bag and a third opening in said flexible enclosing member at said aft end, said nozzle assembly extending from said first opening in said propellant through said second and third openings to the exterior of said rocket, the exterior surface of said nozzle assembly being sealed fluid-tight to the wall of said first opening at said aft end, to said flexible bag and to said flexible enclosing member, means extending from the exterior of said rocket into said first opening within the propellant and in contact therewith for igniting same, whereby upon ignition of said propellant combustion gases pass through said first opening at said forward end thereby expanding said flexible bag and said enclosing member and forming an annulus therebetween thereby allowing equalization of pressures of combustion gases in said annulus and in said first opening.

3. A solid propellant rocket comprising, in combination, a body of solid propellant, an axial opening throughout the length of said body, a layer of fibrous material impregnated with a cured resin restricting material positioned on the outer surface of said propellant, one end of said body of propellant being the head end and the other being the aft end, a flexible, gastight bag surrounding the layer of material and solid propellant, an opening in said bag conforming to the opening in the solid propellant at the aft end thereof, said bag being sealed gastight to the fibrous material impregnated with cured resin surrounding said opening at said aft end, a head end member positioned adjacent the flexible, gastight bag at the head end of said propellant, a nozzle support positioned in said opening in said bag and extending into the opening in the aft end of said propellant, said nozzle support being sealed gastight to the wall of said opening in said aft end of said propellant, a layer of expansible material covering the surface of said bag, said head end member and said nozzle support extending through corresponding openings in said expansible material, a second layer of fibrous material impregnated with a cured resin covering said layer of expansible material, a gas exhaust nozzle supported by said nozzle support, and means positioned operatively to ignite said propellant.

4. A solid propellant rocket comprising, in combination, a generally cylindrical body of solid propellant having rounded ends, an axial opening throughout the length of said body, said opening being of star-shaped cross section to provide burning surface, one end of said body being a forward end and the other being the exhaust end, a first layer of fibrous material impregnated with a cured resinous restricting material positioned on the outer surface of said propellant, a flexible, gastight bag covering said first layer, an opening in said bag conforming to the opening in the solid propellant at the aft end thereof, said bag being sealed gastight to the first layer of impregnated fibrous material around the opening at the exhaust end of said body, a head end member positioned against said bag and covering said opening at said forward end, a nozzle support positioned through the opening in said bag and into the opening in the aft end of said propellant, a layer of expansible rubbery material covering the surface of said bag, said head end member and said nozzle support extending through corresponding openings in said rubbery material, a second layer of fibrous material impregnated with a cured resinous material positioned on the outer surface of said rubbery material, a gas exhaust nozzle supported by said nozzle support, means positioned operatively to ignite said propellant, and said second layer of fibrous material impregnated with a cured resinous material, said layer of rubbery material and said bag being slightly expansible and being adapted to expand slightly under the influence of gas pressure transmitted from said opening in said propellant to the inside surface of said bag thereby equalizing pressure on the inside and outside of said body of propellant during its burning.

References Cited in the file of this patent

UNITED STATES PATENTS 2,733,568     Dickinson _____ Feb. 7, 1956

FOREIGN PATENTS 26,430     Great Britain _____ July 2, 1908